E. J. A. SOMMER.
BICYCLE GRIP.
APPLICATION FILED JAN. 22, 1918.

1,295,627.

Patented Feb. 25, 1919.

WITNESSES
Edw. S. Hall.
Wm. Webster Downing.

INVENTOR
Edward J. A. Sommer.

BY Richard B. Owen.

ATTORNEY

UNITED STATES PATENT OFFICE.

EDWARD J. A. SOMMER, OF BUFFALO, NEW YORK.

BICYCLE-GRIP.

1,295,627.   Specification of Letters Patent.   Patented Feb. 25, 1919.

Application filed January 22, 1918. Serial No. 213,190.

*To all whom it may concern:*

Be it known that I, EDWARD J. A. SOMMER, citizen of the United States, residing at Buffalo, in the county of Erie and State of New York, have invented certain new and useful Improvements in Bicycle-Grips, of which the following is a specification.

My invention relates to bicycle grips and the primary object thereof resides in the provision of a device of this character embodying two sections for removable association with the ends of a handle bar on a bicycle or motorcycle, being peculiarly arranged so that when they are associated with the handle bar, the handles are of a greater length than they are ordinarily when the usual type of grips are associated therewith.

Another object of my invention resides in the provision of a bicycle grip wherein one section is formed preferably of rubber to facilitate the engagement of the hand of the operator therewith to reduce slipping of the hand thereon to a minimum, while the other section, which is associated with both the rubber section and the end of the handle bar, serves to facilitate the mounting of the rubber section in position.

A still further object of my invention resides in the provision of a device of the character described that is simple in construction, efficient in operation and one that can be manufactured and placed upon the market at a minimum cost.

Other objects as well as the nature, characteristic features and scope of my invention will be more readily understood from the following description taken in connection with the accompanying drawings and pointed out in the claims forming a part of this specification.

In the drawings:—

Figure 1:
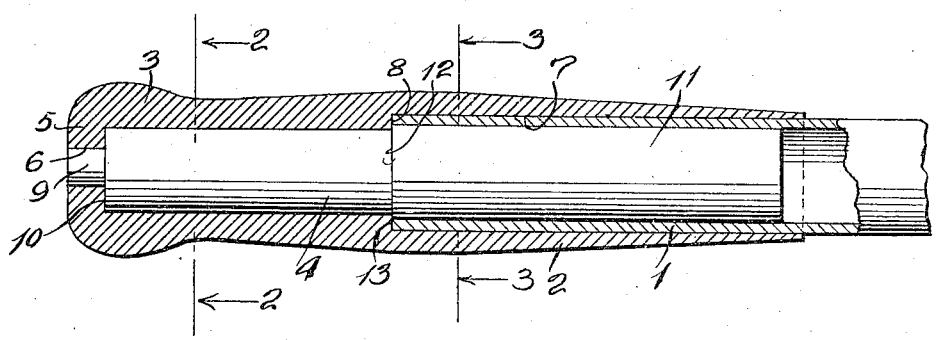
Figure 1 is a longitudinal sectional view of my invention associated with one end of a handle bar.
Figure 2:
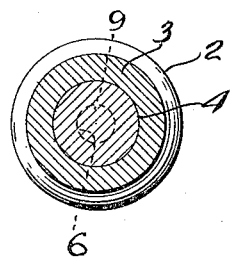
Fig. 2 is a transverse sectional view of my invention taken on line 2—2 of Fig. 1 in the direction in which the arrow points.
Figure 3:
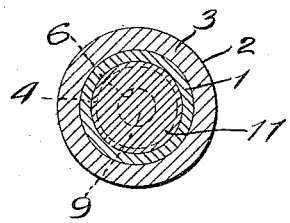
Fig. 3 is a transverse sectional view taken on line 3—3 of Fig. 1 in the direction in which the arrow points.

Referring more particularly to the drawings in which similar reference numerals designate like and corresponding parts throughout the different views, I have associated with the ends of a tubular handle bar of a bicycle or motorcycle, one end of the handle bar 1 being illustrated, one of my improved grips 2 being associated therewith.

Each of these grips is formed of a rubber section 3 and preferably a wood section 4. The rubber section 3 is tubular in form, the outer surfaces thereof being shaped to conform to the configuration of a hand, as is illustrated to advantage in Fig. 1 of the drawings, while one end of the rubber section 3 is closed as indicated by the numeral 5 and provided with a central opening 6. The bore of the tubular rubber section is enlarged from a point substantially intermediate its ends to its end as illustrated by the numeral 7 to provide a shoulder 8 for a purpose to be hereinafter described. Receivable within the rubber section is the wood section 4. The wood section is of a cylindrical formation and has a pin 9 extending longitudinally and centrally from one end thereof, said pin being arranged within the opening 6 in the rubber section, the outer edge thereof being arranged in alinement with the outer surface of the closed end 5 while the inner end of the section 4 abuts the inner surface of the closed end of the cylinder as illustrated by the numeral 10. The outer end of the wood section is enlarged as designated by the numeral 11 to provide a shoulder 12 which abuts the shoulder 8 of the rubber section. The enlarged end 11 of the wood section is arranged in spaced relation with the enlarged end 7 of the bore of the tubular rubber section and terminates adjacent the outer opened end of the said section.

In associating one of my improved grips with one end of a tubular handle bar, the tubular rubber section 3 is arranged about the free end of the tubular handle bar while the enlarged end 11 of the wood section is arranged to telescope within the end of the tubular bore. By exerting a pressure on the outer end of the grip, the section may be slid inwardly on the end of the handle bar until the free end 13 abuts the shoulder 8 as illustrated to advantage in Fig. 1 of the drawings. By this arrangement a substantially rigid yet removable connection between the grip 2 and the handle bar is obtained.

Although I have shown and described the preferred embodiment of my invention, I desire it to be understood that I am not to be limited to the exact details shown, however, I desire that great stress be laid upon the arrangement of a grip embodying two sections, one of which reduces slipping of the hand to a minimum, the sections being peculiarly arranged with each other to efficiently connect the grip provided in a substantially rigid yet removable position on one end of the handle bar of a bicycle or motorcycle.

From the above description taken in connection with the accompanying drawings, it can be easily seen that I have provided a device that is simple in construction, containing but a few simple parts that can be cheaply manufactured and assembled and when assembled can be placed upon the market and sold at a minimum cost.

It will be understood that the above description and accompanying drawings comprehend only the general embodiment of my invention and that various minor changes in detail of construction, proportion and arrangement of the parts may be made within the scope of the appended claims and without sacrificing any of the advantages of my invention.

Having thus fully described my invention, what I claim and desire to secure by Letters Patent, is:

1. A grip for handle bars of motorcycles and bicycles including a tubular section formed of rubber having one end closed and provided with a central opening, a shoulder provided by enlarging the bore of the tubular section, a cylindrical section receivable within the tubular section, a pin projecting from one end of the cylindrical section, and arranged within the opening in the tubular section, one end of said cylindrical section being enlarged and arranged in spaced relation with the enlarged bore of the tubular section, and said sections being telescopically mounted interiorly and exteriorly on the end of a handle bar to allow the bar to abut said shoulder.

2. A bicycle and motorcycle hand grip, which comprises a tubular section having its bore formed of different diameters with a shoulder therebetween, said section being provided with a perforate closed end, the perforations being of lesser diameter than the smaller bore diameter, and capable of receiving a pin, a solid section having different diameters and a pin projecting from one end to pass into the perforations at the end of the tubular sections, the larger diameter of the solid section being of less diameter than the larger diameter of the bore of the tubular section, the smaller diameter of the bore of said latter section being adapted to snugly engage the smaller diameter of the solid section.

In testimony whereof I affix my signature in presence of two witnesses.

EDWARD J. A. SOMMER.

Witnesses:
 MERLE A. TANNER,
 ESTHER W. TANNER.